US008306964B2

(12) United States Patent
Yu et al.

(10) Patent No.: US 8,306,964 B2
(45) Date of Patent: Nov. 6, 2012

(54) EXTRACTION OF RICH SEARCH INFORMATION FROM INDEX SERVERS VIA AN ALTERNATIVE ASYNCHRONOUS DATA PATH

(75) Inventors: Yinzhe Yu, Bellevue, WA (US); Qinghua Zou, Issaquah, WA (US); Pei Pei, Bellevue, WA (US); Gaurav Sareen, Sammamish, WA (US); Wee Wah Alfian Tan, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 160 days.

(21) Appl. No.: 12/840,281

(22) Filed: Jul. 20, 2010

(65) Prior Publication Data

US 2012/0023093 A1 Jan. 26, 2012

(51) Int. Cl.
*G06F 17/30* (2006.01)
(52) U.S. Cl. ........ 707/706; 707/711; 707/723; 707/741; 707/753
(58) Field of Classification Search .............. 707/706, 707/711, 723, 741, 753
See application file for complete search history.

(56) References Cited

U.S. PATENT DOCUMENTS

| | | | |
|---|---|---|---|
| 6,370,527 B1 * | 4/2002 | Singhal ................................ 1/1 |
| 6,516,337 B1 * | 2/2003 | Tripp et al. .................... 709/202 |
| 6,728,704 B2 * | 4/2004 | Mao et al. ............................. 1/1 |
| 6,879,982 B2 * | 4/2005 | Shirasaka ............................. 1/1 |
| 7,028,029 B2 | 4/2006 | Kamvar et al. |
| 7,254,580 B1 * | 8/2007 | Gharachorloo et al. ............... 1/1 |
| 7,395,259 B2 | 7/2008 | Bailey et al. |
| 7,412,494 B2 * | 8/2008 | Dittrich et al. ................. 709/217 |
| 7,428,530 B2 * | 9/2008 | Ramarathnam et al. .............. 1/1 |
| 7,567,953 B2 * | 7/2009 | Kadayam et al. ..................... 1/1 |
| 7,716,203 B2 * | 5/2010 | Chouinard et al. ........... 707/706 |
| 2002/0078045 A1 * | 6/2002 | Dutta ................................. 707/7 |
| 2002/0198869 A1 * | 12/2002 | Barnett ............................. 707/3 |
| 2004/0181515 A1 * | 9/2004 | Ullmann et al. ................... 707/3 |
| 2004/0215607 A1 * | 10/2004 | Travis, Jr. .......................... 707/3 |
| 2005/0154716 A1 * | 7/2005 | Watson et al. .................... 707/3 |
| 2006/0004716 A1 * | 1/2006 | Hurst-Hiller et al. ............. 707/3 |
| 2006/0200455 A1 * | 9/2006 | Wilson ............................. 707/4 |
| 2006/0235824 A1 * | 10/2006 | Cheung et al. ................... 707/1 |
| 2006/0242129 A1 | 10/2006 | Libes et al. |
| 2008/0201304 A1 * | 8/2008 | Sue .................................. 707/3 |
| 2009/0006543 A1 | 1/2009 | Smit |
| 2009/0157629 A1 | 6/2009 | Gutlapalli et al. |

(Continued)

OTHER PUBLICATIONS

Masson, Philippe, "Exploring Space-Time Trade-Offs in the SAP NetWeaver Engine TREX," retrieved at <<http://e-collection.ethbib.ethz.ch/eserv.php?pid=eth:30213&dsID=eth-30213-01.pdf>>, Masters Thesis, Eth Zurich, Mar. 3, 2008, 41 pages.

(Continued)

*Primary Examiner* — Thanh-Ha Dang
(74) *Attorney, Agent, or Firm* — The Law Office of Michael E. Kondoudis (57) ABSTRACT

A search engine system is described herein that provides an alternative data path for collecting results provided by index servers. The alternative data path collects the results in a direct and asynchronous manner; this is in contrast to a synchronous path used to deliver search results to end users via one or more aggregator modules. An analysis system can use the alternative data path to collect a large amount of richly descriptive information regarding the performance of the search engine system, circumventing bottlenecks and other constraints that would otherwise be imposed by the synchronous data path. The analysis system can analyze the information collected from the index servers to improve the performance of the search engine system.

17 Claims, 10 Drawing Sheets

U.S. PATENT DOCUMENTS

2010/0076949 A1  3/2010  Zoeter et al.
2010/0094853 A1  4/2010  Telloli et al.

OTHER PUBLICATIONS

Bilenko, et al., "Mining the Search Trails of Surfing Crowds: Identifying Relevant Websites From User Activity," retrieved at http://www2008.org/papers/pdf/p51-bilenko.pdf>>, Proceeding of the 17th international Conference on World Wide Web, Apr. 2008, pp. 51-60.

Brin, et al., "The Anatomy of a Large-Scale Hypertextual Web Search Engine," retrieved at <<http://infolab.stanford.edu/~backrub/google.html>>, Computer Networks and ISDN Systems, vol. 30, No. 1-7, Apr. 1, 1998, 18 pages.

* cited by examiner

EXTRACTION OF RICH SEARCH INFORMATION FROM INDEX SERVERS VIA AN ALTERNATIVE ASYNCHRONOUS DATA PATH

BACKGROUND

Search engine systems commonly employ a collection of index servers to process a query submitted by an end user. In operation, a search engine system routes the user's query to a subset of the index servers. Each index server in the subset uses index information to identify the top n documents that are considered relevant to the query. Other processing modules in the search engine system then aggregate the results provided by the individual index servers to identify a final set of top m relevant documents. The search engine system then determines snippets and universal resource locator identifiers (URLs) corresponding to the m documents. The search engine system forwards those snippets and URLs to the end user.

In addition to the normal-use production traffic described above, an analyst may submit one or more experimental queries to the search engine system. Upon receiving search results, the analyst may use one or more metrics to assess the relevance of the search results, or to examine some other characteristic of the search results. Based on this investigation, the analyst can modify the behavior of the search engine system to improve its performance.

To perform the above-described analysis tasks, the analyst may submit queries and receive search results via the same data paths used by end users. For instance, the search engine system may generate results in response to an experimental query by aggregating the partial results provided by individual index servers. This approach, however, is not fully satisfactory for reasons set forth in the Detailed Description below.

SUMMARY

An illustrative search engine system is described that provides an alternative data path for collecting results provided by index servers. The alternative data path collects the results directly from the index servers in an asynchronous manner; this is in contrast to a traditional synchronous path used to deliver search results to end users via one or more aggregator modules. An analysis system can use the alternative data path to collect a large amount of richly descriptive information regarding the performance of the search engine system, circumventing bottlenecks and other constraints that would otherwise be imposed by the synchronous data path.

According to one illustrative aspect, each index server includes a result generator module, a post-processor module, and an uploader module. The result generator module generates original intermediate results that identify a set of documents using original document identifiers, referred to herein as Doc IDs. The post-processor module converts the original document identifiers into final document identifiers, e.g., uniform resource locator identifiers (URLs), to yield final results. The uploader module sends the final results to the analysis system. More specifically, the uploader module manages bandwidth by sending the final results of different index servers in a staggered manner.

Each index server can employ various techniques that further improve the efficiency of its processing. For example, each index server can include a provision for reordering result items in the original intermediate results by Doc IDs prior to translating the Doc IDs to URLs. Further, each index server can include a provision for expressing individual result items in multiple lines, and then extracting data from the multi-line result items in a two-part fashion.

According to another illustrative aspect, a job completion determination module (JCDM) can receive final results from plural index servers. The JCDM can use various techniques to determine when it has received all of the final results associated with a particular batch of experimental queries that has been sent to the search engine system.

The above approach can be manifested in various types of systems, components, methods, computer readable media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an illustrative search engine system for sending results generated by index servers to an analysis system via an alternative data path. Section B describes illustrative methods which explain the operation of the search engine system of Section A. Section C describes illustrative processing functionality that can be used to implement any aspect of the features described in Sections A and B.

Figure 11:
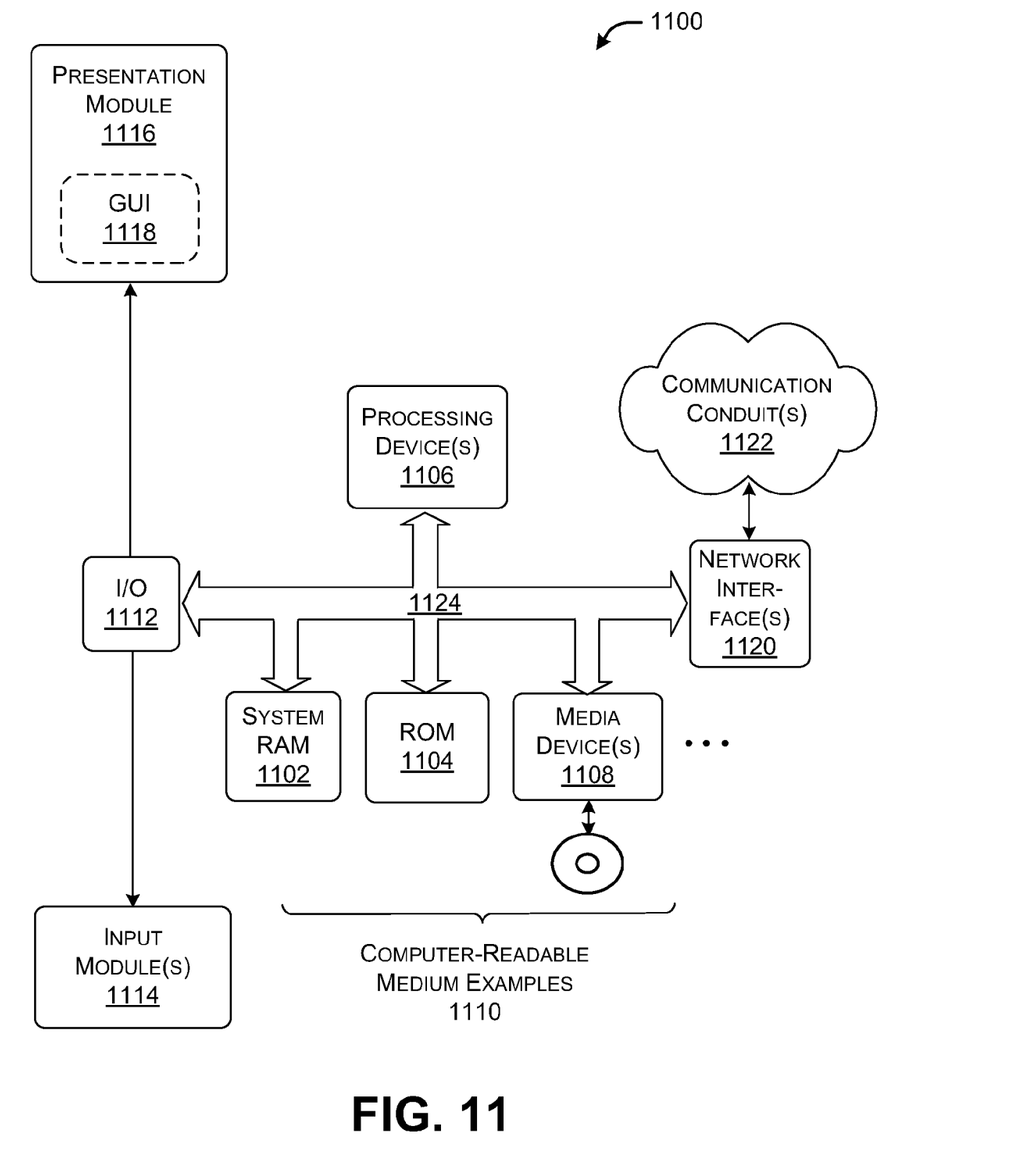
FIG. 11 shows illustrative processing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner. In one case, the illustrated separation of various components in the figures into distinct units may reflect the use of corresponding distinct components in an actual implementation. Alternatively, or in addition, any single component illustrated in the figures may be implemented by plural actual components. Alternatively, or in addition, the depiction of any two or more separate components in the figures may reflect different functions performed by a single actual component. FIG. 11, to be discussed in turn, provides additional details regarding one illustrative implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner.

The following explanation may identify one or more features as "optional." This type of statement is not to be interpreted as an exhaustive indication of features that may be considered optional; that is, other features can be considered as optional, although not expressly identified in the text. Similarly, the explanation may indicate that one or more features can be implemented in the plural (that is, by providing more than one of the features). This statement is not be interpreted as an exhaustive indication of features that can be duplicated. Finally, the terms "exemplary" or "illustrative" refer to one implementation among potentially many implementations.

A. Illustrative Systems

A.1. Overview

Figure 1:
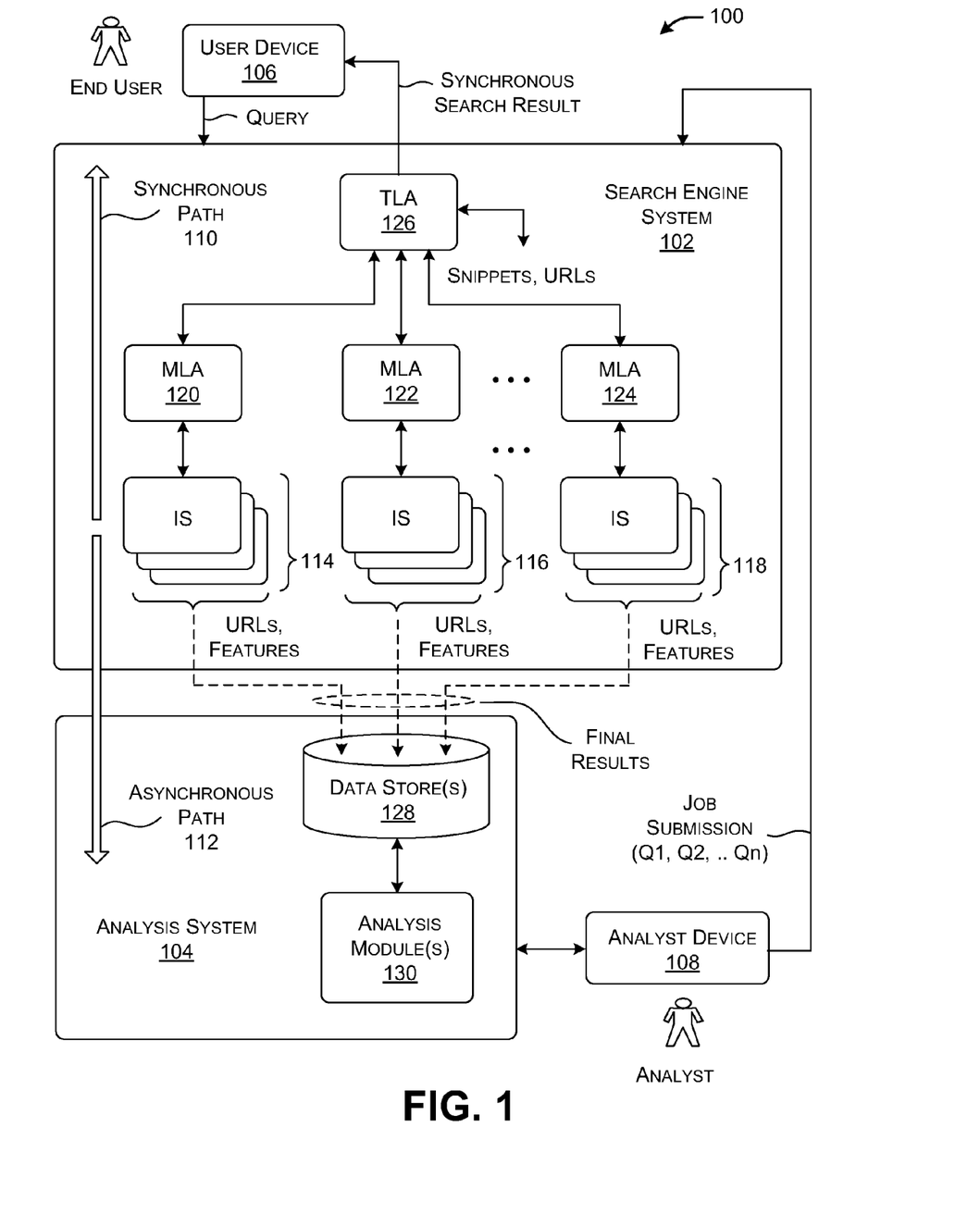
FIG. 1 shows an illustrative search engine system that uses an alternative path to transfer results generated by index servers to an analysis system.

FIG. 1 shows a search environment 100 that includes a search engine system 102 and an analysis system 104. In its normal production use, the search engine system 102 receives queries from end users and identifies documents which are relevant to the queries. In one implementation, the documents may correspond to network-accessible pages. FIG. 1 shows an illustrative end user who operates user device 106 to interact with the search engine system 102.

In contrast, the analysis system 104 investigates the performance of the search engine system 102 for any purpose. For instance, FIG. 1 shows an illustrative analyst who operates an analyst device 108 to submit a batch of experimental queries to the search engine system 102. In response, the search engine system 102 returns results to the analysis system 104. The analyst can use one or more metrics to assess the performance of the search engine system 102, based on the results provided to the analysis system 104. Based on this investigation, the analyst can modify the performance of the search engine system 102 in any manner, such as by adjusting various parameters, deploying new functionality, etc.

FIG. 1 indicates that the end user receives results from the search engine system 102 using a synchronous data path 110. In contrast, the analysis system 104 receives results from the search engine system 102 using an alternative asynchronous data path 112. Both the synchronous data path 110 and the asynchronous data path 112 rely on the use of a plurality of index servers (114, 116, 118). Therefore, the explanation begins by providing high-level information regarding the operation of the index servers (114, 116, 118).

Each index server (IS) stores index information. The index information correlates information contained in documents with document identifiers that identify the documents. In operation, an index server (IS) matches terms in a query against the index information, to generate results. More specifically, the results indicate documents that are deemed relevant to the query. The index server also generates relevance information which conveys the relevance of each identified document with respect to the query.

Figure 2:
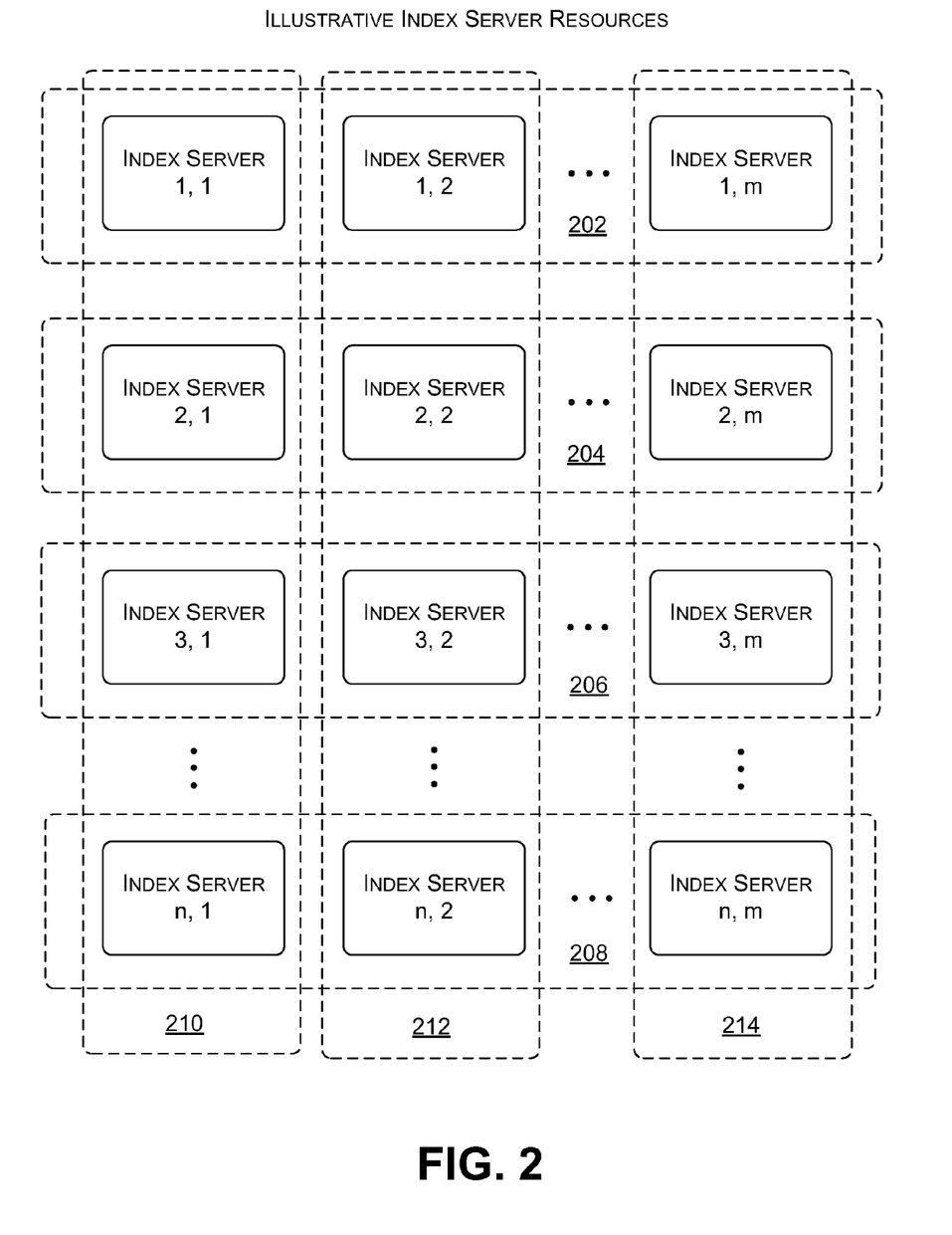
FIG. 2 shows an illustrative organization of index servers within the search engine system of FIG. 1.

Advancing momentarily to FIG. 2, this figure shows one particular organization of index servers in the search engine system 102. The index servers form a plurality of rows (202, 204, 206, . . . 208) and a plurality of columns (210, 212, . . . 214). The index servers in a particular row store different respective portions of global index information. For example, assume that there are one hundred index servers in a row and that the global index information represents a corpus of one million documents (e.g., Web pages). Therefore, each index server stores index information associated with an index portion having 10,000 documents. Different rows provide redundant copies of the global index information. Accordingly, the index servers in a particular column may store the same portion of the global index information.

In operation, the search engine system 102 uses load balancing functionality (not shown) to route a query to one of the rows of index servers. More specifically, the search engine system 102 routes the query to all of the index servers within that row. Each index server responds to the query by generating a list of documents that are relevant to the query. More specifically, each index server identifies the documents using an internal identifier, referred to herein as a Doc ID.

Returning to FIG. 1, the following description first sets forth the characteristics of the synchronous data path 110, followed by the characteristics of the alternative data path 112. The synchronous data path 110 uses a collection of aggregator modules to process the results provided by individual index servers. Namely, in one example, the search engine system 102 includes a plurality of mid-level aggregator modules (120, 122, . . . 124) and a top-level aggregator module 126. Each of the mid-level aggregator modules combines the results provided by a group of index servers. For example, the mid-level aggregator module 120 combines the results provided by the index servers 114. The top-level aggregator module 126 combines the results provided by the mid-level aggregator modules (120, 122, . . . 124). For example, each individual index server can identify the top five documents, while the top-level aggregator module 126 can identify the top ten documents that are assessed as most relevant to a query; the top ten documents are ultimately selected from among the five-member sets of documents provided by the index servers.

At this stage of the synchronous data path 110, the search engine system 102 can also convert the Doc IDs to a final document identifier, such as a uniform resource locator identifier (URL). The search engine system 102 can also associate text snippets with the URLs. The snippets identify portions of the documents which are germane to the query. The search engine system 102 can then forward the URLs and snippets to the end user for the user's inspection. Overall, the synchronous data path 110 can be viewed as a bottom-to-top process operation, where results identified by the index servers propagate up to the top-level aggregator module 126.

The synchronous data path 110 is well suited to fielding queries by end users during normal production use. However, the synchronous data path 110 may not perform in a satisfactory manner when processing experimental queries generated by the analyst. For example, the analyst may wish to extract a relatively large amount of information from the index servers (to be described in greater detail below). The aggregator modules cannot efficiently process this large quantity of information. In other words, the aggregator modules act as processing bottlenecks because limited bandwidth is available at the aggregator modules. In addition, in some cases, the synchronous data path 110 is not designed to collect certain information. For example, assume that a user is interested in collecting the top 50 documents identified by each index server. If the index server is configured to send only the top five documents via the synchronous data path 110, then the user cannot obtain the desired information from the index servers.

The alternative data path 112 overcomes the above-noted limitations of the synchronous data path 110. The alternative data path 112 directly extracts the results generated by the index servers, without first routing the results to the aggregator modules. Namely, the index servers include functionality for directly sending the results generated by the index servers to one or more data stores 128 (referred to in the singular below for brevity). The advantages are at least twofold. First, the alternative data path 112 can avoid the bandwidth limitations of the aggregator modules. Second, the alternative data path 112 can provide a more robust and flexible wealth of information compared to the synchronous data path 110. For example, using the alternative data path 112, an index server can provide more than the n relevant documents that are forwarded to the aggregator modules via the synchronous data path 110.

To function in the manner described above, the index servers include new functionality to process the results before sending the results to the data store 128. For example, the index servers include functionality for converting the Doc IDs to URLs. By contrast, the synchronous data path 110 performs this conversation after aggregating the top m documents, not at the bottom-level of individual index servers. Sections A.2 and B provide additional details regarding such new functionality.

In one implementation, the alternative data path 112 can be considered asynchronous in the sense that it need not provide results in real-time response to the submission of queries. For example, the alternative data path 112 may handle the transfer of a relatively large amount of information. In some cases, the alternative data path 112 provides this large quantity of information minutes or hours or days after the submission of the batch of experimental queries, or, in any event, at a timing that is not closely bound to the submission of the experimental queries.

Finally, the analysis system 104 can include one or more analysis modules 130 (referred to in the singular below for brevity). The analysis module 130 can perform any type of analysis on the results collected via the alternative data path 112. For example, the analysis module 130 can assess the extent to which the identified documents are relevant to the experimental queries. In one implementation, the analysis module 130 can include one or more data mining tools, one or more statistical analysis tools, and/or, one or more rules-based analysis tools, etc.

In performing its functions, the analysis module 130 can examine any features returned by the alternative data path 112. A feature refers to any information which has a bearing on the relevance of identified documents. For example, one type of feature can identify the number of instances of a query term within the header of a document. No limitation is placed on what may constitute a feature as this term is used herein.

The search engine system 102 and the analysis system 104 can be implemented by any combination of processing equipment. For example, each of the search engine system 102 and the analysis system 104 can be implemented by one or more server computers, one or more data stores, routing functionality, and so on. Each of the user device 106 and the analyst device 108 can likewise be implemented in any manner, such as by using a personal computer, a laptop computer, a personal digital assistant device, a mobile telephone device, a set-top box device, a game console device, and so on. The user device 106 and analyst device 108 can communicate with the search engine system 102 via any type of network, such as a wide area network (e.g., the Internet), a local area network, and so on. The network can be implemented by any combination of wired links, wireless links, name servers, routers, gateways, etc., governed by any protocol or combination of protocols. The search engine system 102 can likewise communicate with the analysis system 104 via any type of network or point-to-point connection.

A.2. Illustrative Index Server

Figure 3:
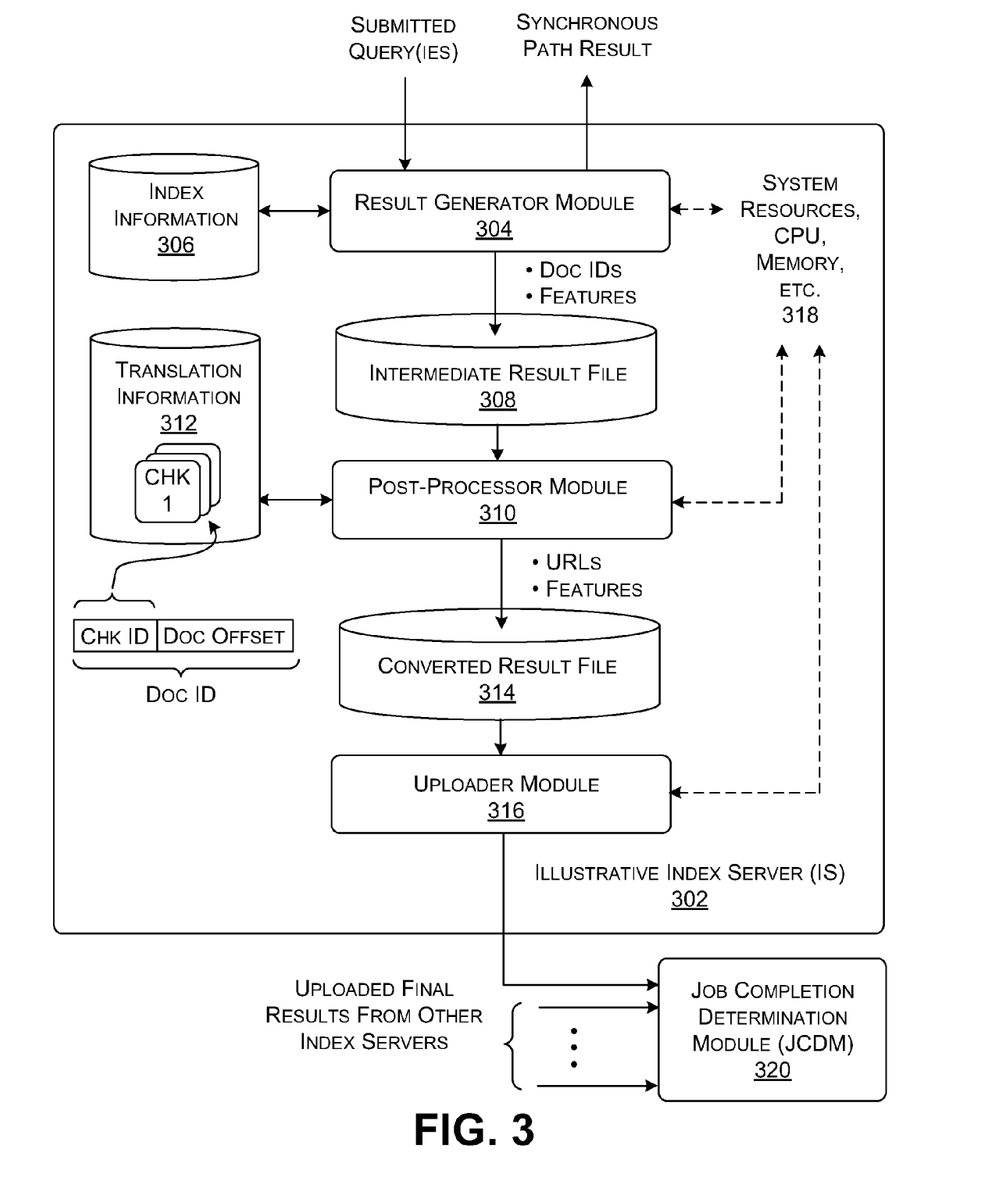
FIG. 3 shows illustrative functionality provided by each index server within the search engine system of FIG. 1.

FIG. 3 shows additional details regarding one of the index servers that can be used in the search engine system 102 of FIG. 1. Starting from the top of the figure and proceeding down, the index server 302 includes a result generator module 304 that receives experimental queries within a batch of queries. As will be discussed shortly, each experimental query is identified based on a query identifier (query ID) and a job identifier (batch ID). Each experimental query may include one or more query terms. In addition, each experimental query can include any type of supplemental information which instructs the index server 302 to collect particular feature information. The result generator module 304 makes use of index information stored in a data store 306 to identify a set of relevant documents for each experimental query. As explained above, the index information may refer to a portion of global index information.

In the synchronous mode of operation, the result generator module 304 passes the set of relevant results to one of the mid-level aggregator modules. By contrast, in the alternative data path 112, the result generator module 304 sends its results to an intermediate result file provided in a data store 308. These results are referred to herein as original intermediate results (to distinguish the results from a later transformation of the results). The original intermediate results for a batch of queries includes original document identifiers, such as internal Doc IDs. The original intermediate results also include feature information associated with the Doc IDs. The feature information may convey the relevance of the documents identified by the results.

A post-processor module 310 transforms the original intermediate results into the final results by converting the Doc IDs into final document identifiers, such as URLs. The post-processor module 310 performs this task by making reference to translation information stored in a data store 312. The translation information maps a subset of Doc IDs to corresponding URLs. In other words, the index server 302 stores a particular portion of global translation information that complements its particular portion of global index information (which is stored in data store 306). In one implementation, the index server 302 stores its translation information in the form of a plurality of component files, referred to herein as translation chunks. Accordingly, in the process of transforming the original intermediate results, the post-processor module 310 reads the translation chunks to access the translation information contained therein. After performing the transformation, the post-processor module 310 stores its results in a converted result file provided in a data store 314. The transformed results are referred to as final results herein.

An uploader module 316 module next sends the final results to the analysis system 104. In one case, the uploader module 316 is configured to send its final results to the analysis system 104 at a specified time, where that specified time is staggered with respect to the respective specified times of other index servers.

Overall, FIG. 3 indicates that the index server 302 relies on system resources 318 to perform the functions described above. The system resources 318 include processor (CPU) resources, memory resources, and so on. The result generator module 304 consumes most of the system resources 318 in the course of generating the relevant documents and feature information, since this represents the main purpose of the index server 302. The other functionality of the index server 302 (such as the post-processor module 310 and the uploader module 316) performs supplemental tasks associated with the alternative data path 112. According to one implementation, the other functionality is designed to make reduced demands on the system resources 318 so as not to interfere with the result generator module 304. Section B will provide details regarding how the other functionality of the index server 302 accomplishes this objective.

As noted above, a data store 128 may store the final results provided by multiple index servers. The analysis system 104 (or some other agent) may also provide a job completion determination module (JCDM) 320. The JCDM 320 monitors the final results that it receives for each batch of experimental queries. The job determination module 320 determines when it has received all of the final results associated with that batch. Section B describes various techniques that the JCDM 320 can use to perform this task.

B. Illustrative Processes

FIGS. 4-10 show procedures which explain one manner of operation of the search engine system 102 and analysis system 104 of FIGS. 1-3. Since some of the principles underlying the operation of these systems have already been described in Section A, certain operations will be addressed in summary fashion in this section.

Figure 4:
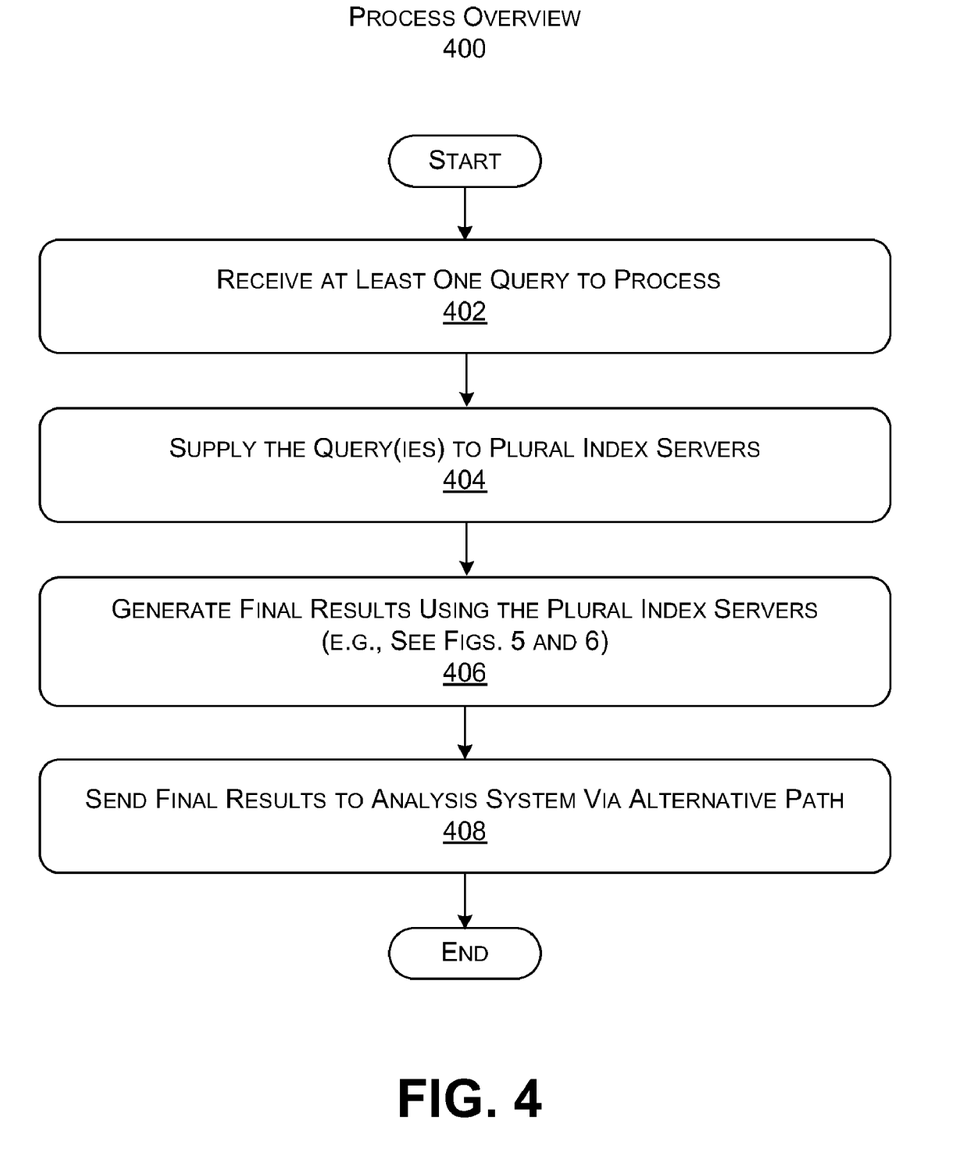
FIG. 4 shows an overview of a process for collecting results via the alternative path shown in FIG. 1.

Starting with FIG. 4, this figure shows a procedure 400 which represents an overview of the operation of the search engine system 102 of FIG. 1. In block 402, the search engine system 102 receives at least one query to process. It will be assumed in the subsequent explanation that the queries in a batch of queries correspond to experimental queries. The experimental queries are formulated to investigate at least one characteristic of the search engine system 102.

In block 404, the search engine system 102 supplies the queries to plural index servers, such as the index servers in a particular row of index servers shown in FIG. 2. Each index server receives the same queries in the batch. But each index server may act on the queries using a different portion of global index information.

Figure 5:
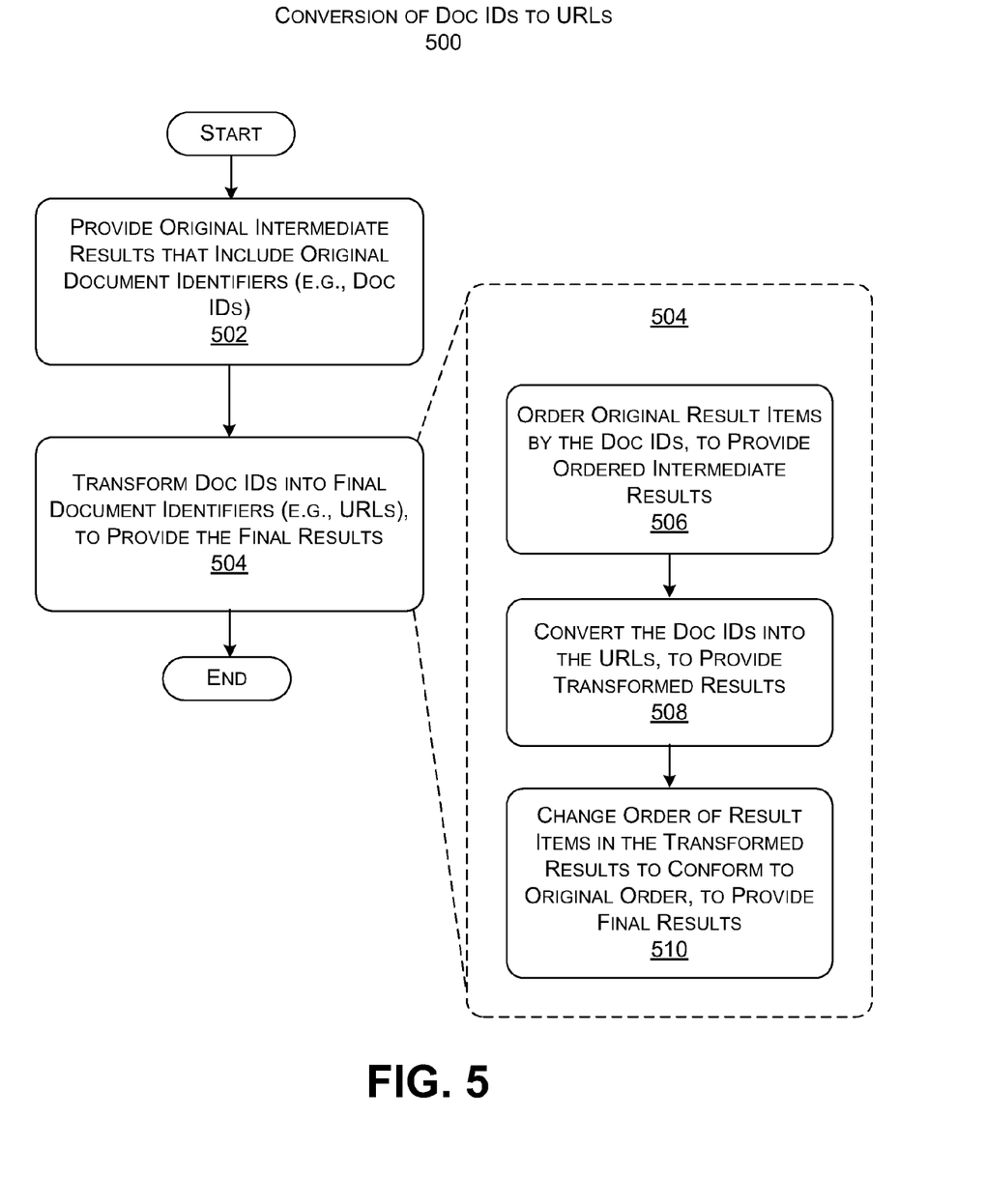
FIG. 5 shows a procedure for converting Doc IDs to URLs within the context of the overview procedure shown in FIG. 4.

In block 406, the search engine system 102 generates final results using the plural index servers based on the queries. The final results will include URLs that have been substituted in place of corresponding Doc IDs. FIG. 5 describes one technique by which each index server may generate its final results.

In block 408, the search engine system 102 sends plural instances of the final results to the analysis system 104 via the alternative data path 112. The search engine system 102 can stagger the plural instances of the final results so that they are not all sent at the same time.

FIG. 5 shows a procedure 500 which provides additional details regarding block 406 in FIG. 4. In this procedure 500, each index server transforms the original intermediate results into final results, and, in the process, translates Doc IDs to URLs. Doc IDs refer to the documents using identifying information that is "internal" to the search engine system 102, which may change over time. URLs refer to the documents in a more stable and widely-accepted manner. The procedure 500 of FIG. 5 will be set forth in the context of the representative index server 302 of FIG. 3, in conjunction with the example of FIG. 6. More specifically, the post-processor module 310 of the index server 302 performs the actions specified in FIG. 5.

In block 502, the post-processor module 310 provides original intermediate results that include plural original result items, together with feature information. In block 504, the post-processor module 310 transforms the original intermediate results into the final results by converting original document identifiers into final document identifiers, e.g., Doc IDs to URLs.

Figure 6:
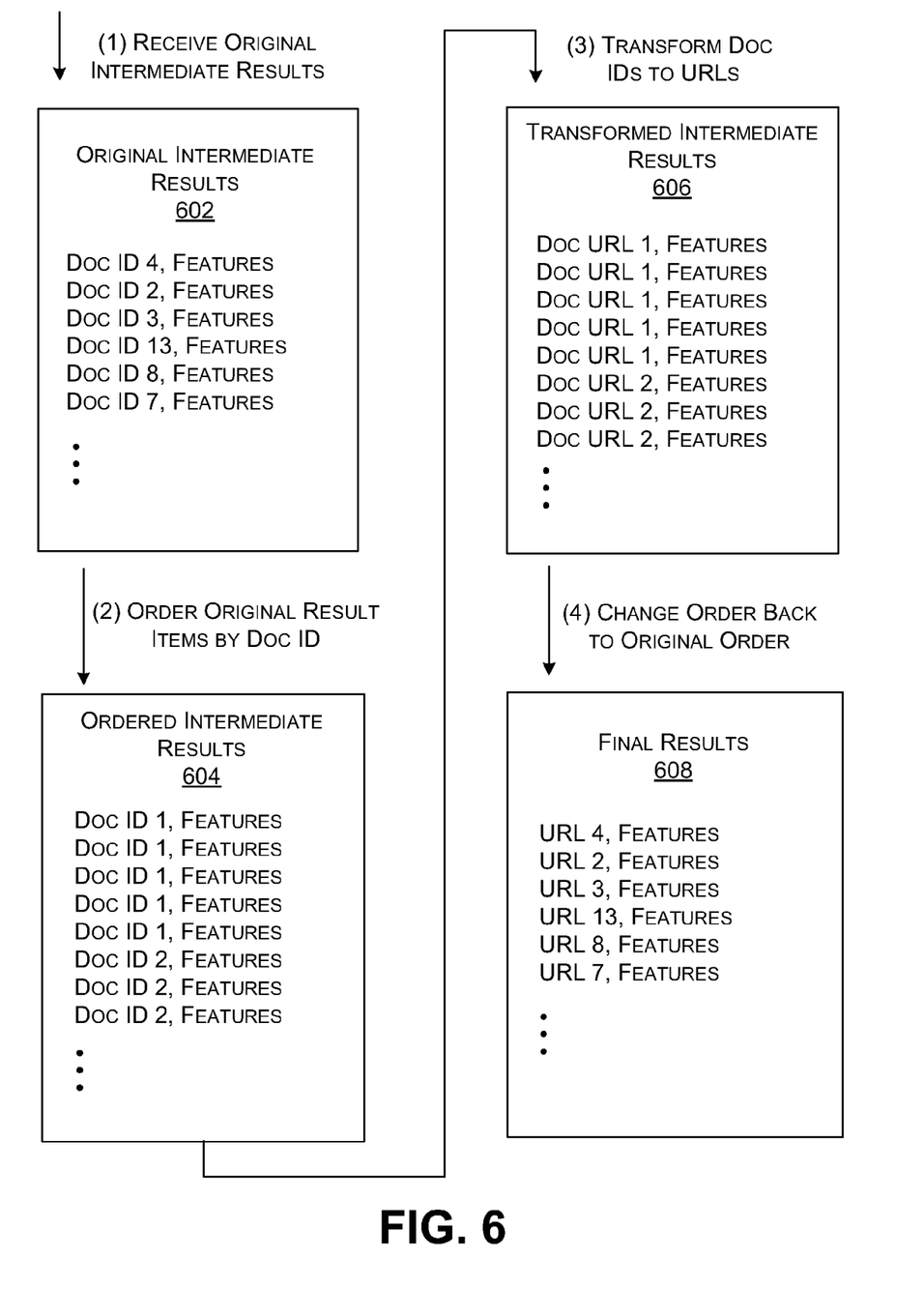
FIG. 6 shows an example of the operations depicted in FIG. 5.

The right-hand portion of FIG. 5 describes one way to implement block 504. Namely, in block 506, the post-processor module 310 begins by ordering the original intermediate results based on the Doc IDs. For example, FIG. 6 shows a small portion of original intermediate results 602. The original intermediate results 602 include a collection of original result items. Each intermediate result item, in turn, includes a Doc ID and feature information. Block 506 involves changing the order of the intermediate result items based on the Doc IDs, such that all instances of Doc ID 1 are grouped together, all the instances of Doc ID 2 are grouped together, and so on. This ordering operation produces ordered intermediate results 604 shown in FIG. 6.

In block 508, the post-processor module 310 converts the Doc IDs in the ordered intermediate results into URLs to produce transformed results 606 shown in FIG. 6. Because the Doc IDs have been grouped together, the post-processor module 310 can access each translation chunk once to perform all of the conversion operations that can be performed using this particular translation chunk. For example, the post-processor module 310 can access a first translation chunk to convert all the instances of Doc ID 1 into instances of URL 1. If reordering was not performed, the post-processor module 310 would be asked to repeatedly read from the same translation chunk when Doc ID 1 is encountered interspersed among other Doc IDs. Accessing translation chunks only once is desirable because random access is an "expensive" operation in terms of its demands on system resources 318.

Return momentarily to FIG. 3, this figure illustrates one way in which an individual Doc ID can be used to find a corresponding URL. In one case, the Doc ID is a string composed of a chunk ID and a document offset. The chunk ID describes the translation chunk that contains the corresponding URL of the Doc ID in question. The document offset describes the location of the corresponding URL within the translation chunk. This means that a set of consecutive Doc IDs have the same chunk ID and therefore correspond to the same translation chunk. This further means that a single access to a single translation chunk can be used to convert a plurality of Doc IDs that share that same prefix.

In block 510 of FIG. 5, the post-processor module 310 changes the order of the transformed results back to the original order specified by the original intermediate results (e.g., the order specified by the original intermediate results 602). This produces the final results 608 shown in FIG. 6.

Figure 7:
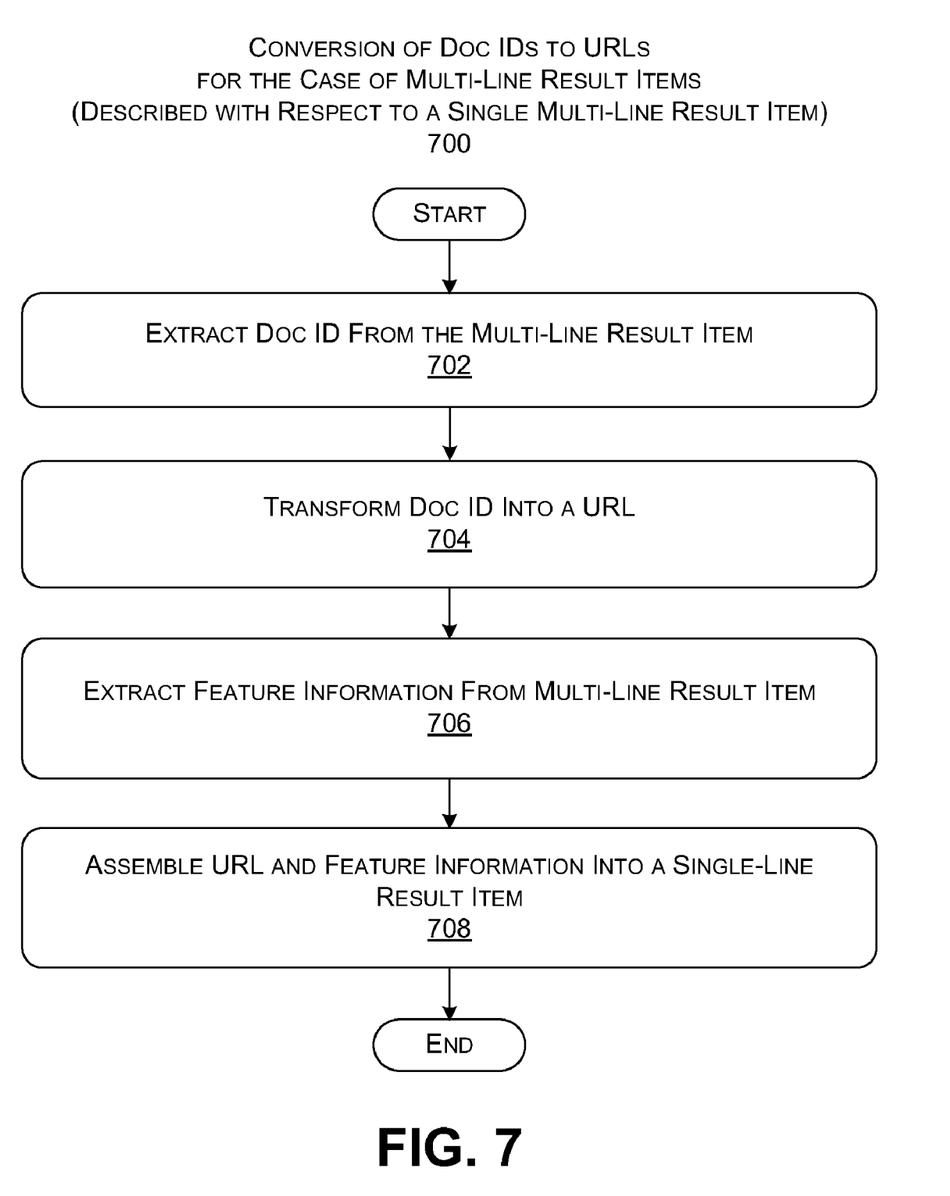
FIG. 7 shows a procedure for processing multi-line result items within the context of the overview procedure shown in FIG. 4.

FIG. 7 shows a procedure 700 which represents a variation of the conversion operation shown in FIG. 5. This procedure 700 will be explained in conjunction with the example shown in FIG. 8. To begin with, an analyst may be interested in extracting a large amount of feature information from the index server 302, which yields large result items. According to one implementation, the index server 302 may impose a limit on the amount of information that can be expressed in a single-line result item. The result generator module 304 can accommodate this constraint by breaking large result items into multiple lines, each of which complies with the specified size constraint.

Figure 8:
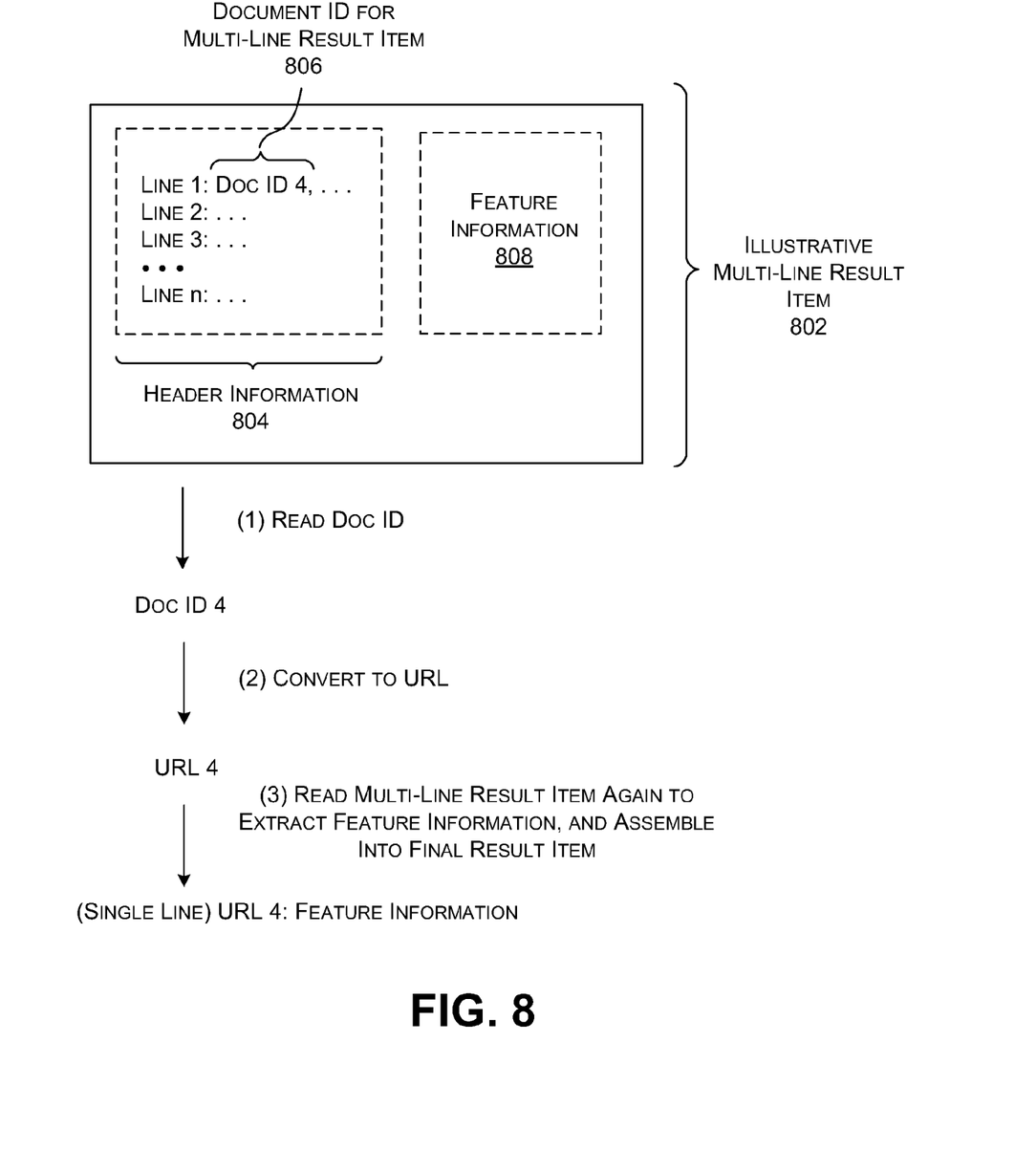
FIG. 8 shows an example of the operations depicted in FIG. 7.

For example, FIG. 8 shows a multi-line result item 802 that includes n lines of information. According to one data structure, the multi-line result item 802 may include header information 804 which expresses attributes associated with the lines. In part, the header information 804 includes at least one attribute that specifies a document identifier 806 associated with the multi-line result item 802. For example, in this case, the first line of the multi-line result item 802 indicates that the multi-line result item 802 pertains to Doc ID 4. The multi-line result item 802 also specifies feature information 808 in any fashion.

The use of multi-line result items only solves part of the problem, however. As described above, the post-processor module 310 may only have limited system resources 318 to perform supplemental tasks associated with the alternative data path 112. Accordingly, the inclusion of large result items runs the risk of overtaxing the system resources 318, and in particular, the memory resources. The procedure 700 of FIG. 7 explains one way of addressing this issue.

In block 702, the post-processor module 310 extracts the Doc IDs from the original intermediate results. Although not shown, prior to performing this operation, the post-processor module 310 can reorder the result items based on Doc IDs in the manner described above. Block 702 yields a vector that provides the Doc IDs associated with plural result items.

In block 704, the post-processor module 310 transforms the Doc IDs into URLs in the manner described above. The post-processor module 310 performs this operation more efficiently if the Doc IDs have been grouped together in the manner described above (with reference to FIG. 5).

In block 706, the post-processor module 310 then again reads the multi-line result items to extract the feature information from them. In one case, the data structure used to represent multi-line result items provides the feature information in predetermined locations within the data structure. Hence, the post-processor module 310 can extract the feature information from those locations without having to perform ad hoc analysis of the content in the multi-line result items.

In block 708, the post-processor module 310 combines the URLs (which it has generated in block 704) with the feature information (which it has generated in block 706) to form a single-line result item for each former multi-line result item. The uploader module 316 forwards this single-line result item, along with others, to the analysis system 104.

FIG. 8 illustrates operations 704, 706, and 708 with respect to the representative multi-line result item 802. In this case, the post-processor module 310 extracts the identifier Doc ID 4 from the first line of the multi-line result item 802. Then the post-processor module 310 transforms the Doc ID 4 into its counterpart URL, e.g., URL 4. Then the post-processor module 310 extracts the feature information 808 associated with the multi-line result item 802. Then the post-processor module 310 combines the URL 4 identifier with the feature information 808.

Figure 9:
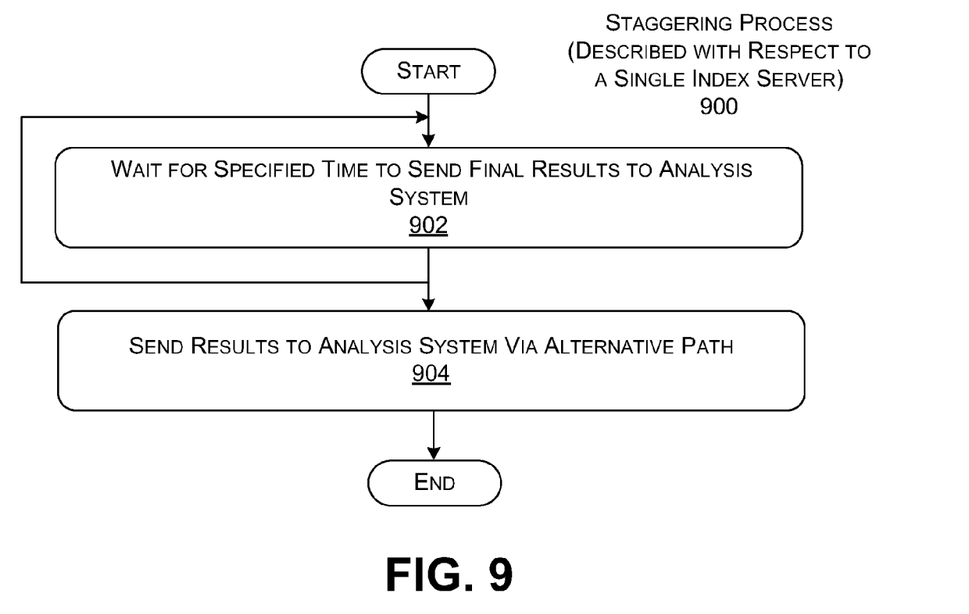
FIG. 9 shows a procedure for uploading final results from an index server to the analysis system within the context of the overview procedure shown in FIG. 4.

FIG. 9 shows a procedure 900 by which the uploader module 316 sends the final results to the analysis system 104. In block 902, the uploader module 316 waits until a scheduled time has occurred to send its final results to the analysis system 104. In block 904, the uploader module 316 sends the final results when the scheduled time has arrived.

In a more encompassing context, the search engine system 102 can stagger the scheduled times of different respective index servers such that a large number of index servers are not sending final results at the same time. This reduces large spikes in result traffic. The spikes may be large because each index server may itself generate a large quantity of final results.

The search engine system 102 can use different strategies to stagger the uploading of final results. For example, the index servers may be organized in plurality of racks, referred to as pods. That is, each pod may include a set of index servers. The search engine system 102 can configure a pod such that each of its index servers periodically sends it final results to the analysis system 104, e.g., every 30 minutes. Further, the search engine system 102 can assign an order to index servers in a pod. Each index server in the pod uploads its final results p units of time following its preceding index server in the assigned order. For example, a first index server in the pod can submit its final results at time x, while a second index server in the pod can submit its final results at time x+p, where p is a time offset (e.g., 3 minutes in one merely representative case).

In one implementation, there is no central coordination which controls the upload times of any two separate pods with respect to each other. In another implementation, the search engine system 102 can centrally manage the upload items of multiple pods.

More generally, the search engine system 102 can use any one or more of the follow paradigms to stagger results: random selection of upload times; round-robin selection of upload times; demand-based selection of upload times, and so on.

Figure 10:
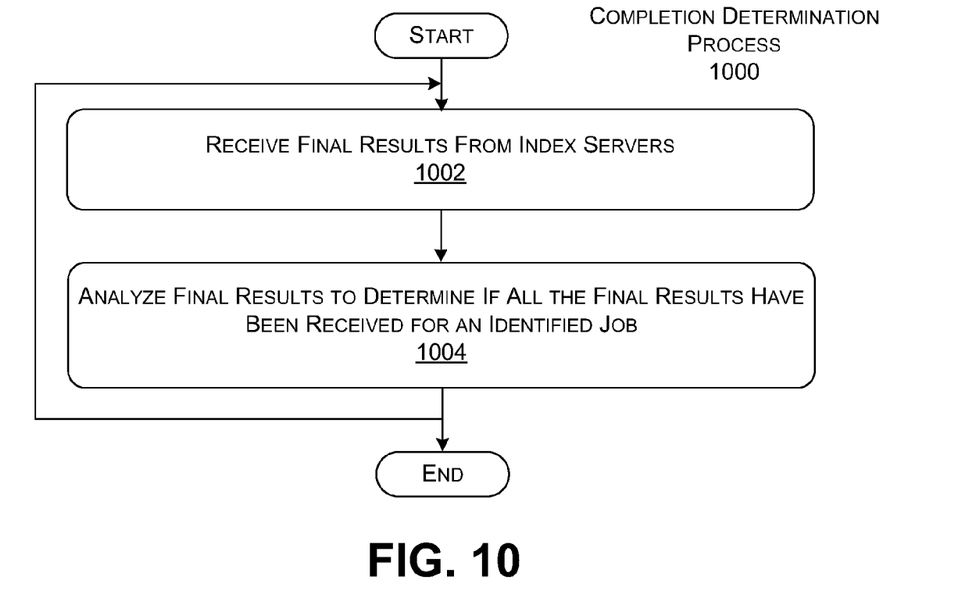
FIG. 10 shows a procedure for determining when all final results, associated with a particular batch of queries, have been received from the index servers.

FIG. 10 shows a procedure 1000 that represents one manner of operation of the job completion determination module (JCDM) 320 of FIG. 3. In one case, the analysis system 104 can implement the JCDM 320. In another case, some other agent can implement the JCDM 320.

In block 1002, the JCDM 320 can receive final results generated by the index servers which have been assigned to process a particular batch of experimental queries. In block 1004, the JCDM 320 can analyze the final results to determine when all of the final results have been received for the complete batch.

The JCDM 320 can use different techniques to perform the functions summarized above. In one case, the search engine system 102 tags each experimental query with a query ID (which identifies the particular query itself) and a batch ID (which identifies the batch to which the query belongs). Further, the search engine system 102 can assign a machine identifier to a query which identifies the index server which has processed the query. Recall that the search engine system 102 may send the query to multiple index servers, so different instances of the query have different machine IDs associated therewith. The index servers can preserve the various identifiers described above in the final results that they send to the JCDM 320.

In operation, the JCDM 320 can formulate an expectation of the pieces of the final result information which it needs to account for an entire batch. The JCDM 320 can assess whether it has received all of the final results by continually comparing the results that it has received thus far against its formulated expectation. In one implementation, for instance, the JCDM 320 is given information which indicates that a particular job Z includes 1000 experimental queries, and that each experimental query is sent to index servers A, B, and C. Accordingly, the JCDM 320 can formulate an expectation that a complete set of result items will include 1000 instances of final results from index server A, 1000 instances of final result items from index sever B, and 1000 instances of final results from index server C, etc.

In certain cases, an index server may not identify any relevant documents for a particular query. To address this situation, the index server can at least send some administration information to the JCDM 320 to inform it that it has analyzed the query.

C. Representative Processing Functionality

FIG. 11 sets forth illustrative electrical data processing functionality 1100 that can be used to implement any aspect of the functions described above. With reference to FIG. 1, for instance, the type of processing functionality 1100 shown in FIG. 11 can be used to implement any aspect of the search engine system 102 and/or the analysis system 104. In one case, the processing functionality 1100 may correspond to any type of computing device (or plural computing devices), each of which includes one or more processing devices.

The processing functionality 1100 can include volatile and non-volatile memory, such as RAM 1102 and ROM 1104, as well as one or more processing devices 1106. The processing functionality 1100 also optionally includes various media devices 1108, such as a hard disk module, an optical disk module, and so forth. The processing functionality 1100 can perform various operations identified above when the processing device(s) 1106 executes instructions that are maintained by memory (e.g., RAM 1102, ROM 1104, or elsewhere). More generally, instructions and other information can be stored on any computer readable medium 1110, including, but not limited to, static memory storage devices, magnetic storage devices, optical storage devices, and so on. The term computer readable medium also encompasses plural storage devices.

The processing functionality 1100 also includes an input/output module 1112 for receiving various inputs from a user (via input modules 1114), and for providing various outputs to the user (via output modules). One particular output mechanism may include a presentation module 1116 and an associated graphical user interface (GUI) 1118. The processing functionality 1100 can also include one or more network interfaces 1120 for exchanging data with other devices via one or more communication conduits 1122. One or more communication buses 1124 communicatively couple the above-described components together.

In closing, the description may have described various concepts in the context of illustrative challenges or problems. This manner of explication does not constitute an admission that others have appreciated and/or articulated the challenges or problems in the manner specified herein.

More generally, the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, using a search engine system, for providing results to an analysis system, comprising:
    receiving at least one query that has been prepared to investigate at least one characteristic of the search engine system;
    supplying said at least one query to plural index servers;
    generating final results using the plural index servers based on said at least one query; and
    sending said final results from the plural index servers to the analysis system using an alternative data path, the alternative data path being different from a synchronous data path used to send search results to end users,
    wherein said generating of the final results comprises, with respect to each index server:
        providing original intermediate results that include plural original result items, the plural original result items identifying respective documents using original document identifiers; and
        transforming the original intermediate results into an instance of the final results by converting the original document identifiers into final document identifiers, by:
            ordering the plural original result items based on the original document identifiers, to provide ordered intermediate results;
            converting the original document identifiers in the ordered intermediate results into the final document identifiers, based on an order specified in the ordered intermediate results, to provide transformed results; and
            changing the order of the transformed results back into an original order specified by the original intermediate results, to provide the instance of the final results.

2. The method of claim 1, wherein the synchronous data path involves use of at least one aggregator module that aggregates search results provided by the plural index servers, and wherein the alternative data path does not use any aggregator modules.

3. The method of claim 1, wherein the alternative data path is an asynchronous data path.

4. The method of claim 1, wherein said at least one query comprises a batch that includes plural queries.

5. The method of claim 4, wherein each query in the batch of queries includes a query identifier and a batch identifier.

6. The method of claim 1, wherein the final document identifiers comprise universal resource locator identifiers.

7. The method of claim 1, wherein at least one original result item in the original intermediate results is a multi-line result item that includes plural lines, and wherein said transforming comprises:
    extracting an original document identifier from the multi-line result item;
    transforming the original document identifier into a final document identifier;
    extracting feature information from the multi-line result item; and
    assembling the final document identifier and the feature information into a single-line result item of the final results.

8. The method of claim 1, wherein said sending comprises, for each index server:
    waiting a specified time to send an instance of the final results to the analysis system; and
    at the specified time, sending the instance of the final results to the analysis system via the alternative data path, wherein specified times for the plural index servers differ from each other.

9. The method of claim 1, further comprising, at a job completion determination module:
    receiving the final results provided by plural index server modules; and
    analyzing the final results to determine if all the final results have been received for an identified batch of queries.

10. An index server, comprising:
    a central processor unit (CPU);
    a result generator module configured to provide original intermediate results that include plural original result items, the plural original result items identifying respective documents using original document identifiers;
a post-processor module configured to transform the original intermediate results into final results by converting the original document identifiers into final document identifiers; and
an uploader module configured to send the final results to an analysis system using an alternative data path, the alternative data path being different from a synchronous data path used to send search results to end users,
wherein the post-processor module comprises:
logic configured to order the plural original result items based on the original document identifiers, to provide ordered intermediate results;
logic configured to convert the original document identifiers in the ordered intermediate results into the final document identifiers, based on an order specified in the ordered intermediate results, to provide transformed results; and
logic configured to change the order of the transformed results back into an original order specified by the original intermediate results, to provide the final results.

11. The index server of claim 10, wherein the alternative data path is an asynchronous data path.

12. The index server of claim 10, wherein the original document identifiers comprise internal document identifiers used by the index server to identified respective documents, and wherein the final document identifiers comprise uniform resource locator identifiers.

13. The index server of claim 10, wherein at least one original result item in the original intermediate results is a multi-line result item that includes plural lines, and wherein said post-processor comprises:
logic configured to extract an original document identifier from the multi-line result item;
logic configured to transform the original document identifier into a final document identifier;
logic configured to extract feature information from the multi-line result item; and
logic configured to assemble the final document identifier and the feature information into a single-line result item of the final results.

14. The index server of claim 10, wherein the uploader module comprises logic configured to send the final results to the analysis system via the alternative data path at a specified time, wherein specified times for plural index servers differ from each other.

15. A computer usable memory storing computer readable instructions, the computer readable instructions providing index server logic when executed by one or more processing devices, the computer readable instructions comprising:
logic configured to provide original intermediate results that include plural original result items, the plural original result items identifying respective documents using original document identifiers;
logic configured to order the plural original result items based on the original document identifiers, to provide ordered intermediate results;
logic configured to convert the original document identifiers in the ordered intermediate results into final document identifiers, based on an order specified in the ordered intermediate results, to provide transformed results;
logic configured to change the order of the transformed results back into an original order specified by the original intermediate results, to provide final results; and
logic configured to send the final results to an analysis system using an alternative data path, the alternative data path being different from a synchronous data path used to send search results to end users via at least one accumulator module.

16. The computer usable memory of claim 15, wherein at least one original result item in the original intermediate results is a multi-line result item that includes plural lines.

17. The computer usable memory of claim 15, wherein said logic configured to send is operative to send the final results in a staggered manner with respect to other index server logic employed by other respective index servers.

* * * * *